United States Patent
Diatzikis

(10) Patent No.: US 9,551,598 B2
(45) Date of Patent: Jan. 24, 2017

(54) FIBER OPTIC SENSING APPARATUS WITH AN IMPROVED FIBER-AFFIXING DEVICE

(71) Applicant: Siemens Energy, Inc., Orlando, FL (US)

(72) Inventor: Evangelos V. Diatzikis, Chuluota, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 374 days.

(21) Appl. No.: 14/275,043

(22) Filed: May 12, 2014

(65) Prior Publication Data

US 2015/0323353 A1    Nov. 12, 2015

(51) Int. Cl.
| | |
|---|---|
| *G02B 6/00* | (2006.01) |
| *G01D 11/24* | (2006.01) |
| *G02B 6/38* | (2006.01) |
| *G01K 11/32* | (2006.01) |
| *G01D 5/353* | (2006.01) |

(52) U.S. Cl.
CPC ............. *G01D 11/245* (2013.01); *G01K 11/32* (2013.01); *G02B 6/3887* (2013.01); *G01D 5/353* (2013.01)

(58) Field of Classification Search
None
See application file for complete search history.

(56) References Cited

U.S. PATENT DOCUMENTS

| | | | |
|---|---|---|---|
| 2,727,088 A * | 12/1955 | La Wall | H01B 17/58 174/135 |
| 4,253,729 A | 3/1981 | Rocton | |
| 4,494,823 A * | 1/1985 | Yoshida | G02B 6/32 356/328 |
| 4,948,222 A | 8/1990 | Corke et al. | |
| 5,067,783 A | 11/1991 | Lampert | |
| 5,109,458 A | 4/1992 | Dixit et al. | |
| D360,820 S * | 8/1995 | Haase | D8/356 |
| 5,469,745 A | 11/1995 | Twerdochlib | |
| 5,574,819 A | 11/1996 | Gunther et al. | |
| 5,627,343 A * | 5/1997 | Brandolf | H02G 3/22 156/86 |

(Continued)

FOREIGN PATENT DOCUMENTS

| | | |
|---|---|---|
| JP | 2003021562 A | 1/2003 |
| WO | 2013134199 A1 | 9/2013 |

OTHER PUBLICATIONS

PCT International Search Report mailed Jul. 7, 2015 corresponding to PCT International Application No. PCT/US2015/026746 filed Apr. 21, 2015 (5 pages).

*Primary Examiner* — Rhonda Peace

(57) ABSTRACT

A fiber optic sensing apparatus that may be used to sense one or more conditions of an electromotive machine is provided. A housing (20) encloses an optical fiber sensor (18). An optical fiber (19) extends into the housing through an opening formed in the housing. A fiber-affixing device (15) may be affixed to the optical fiber proximate the opening. The fiber-affixing device includes opposed bearing surfaces (30, 32) extending away from the optical fiber and disposed against opposed inner and outer surfaces (34, 36) of the housing surrounding the opening. The fiber-affixing device is effective to affix the optical fiber within the opening, thereby substantially improving the robustness and survivability of the optical fiber sensor.

16 Claims, 3 Drawing Sheets

(56) References Cited

U.S. PATENT DOCUMENTS

| | | | | |
|---|---|---|---|---|
| 5,684,718 A * | 11/1997 | Jenkins | G01H 1/003 324/765.01 |
| 5,887,095 A | 3/1999 | Nagase et al. | |
| 6,175,108 B1 * | 1/2001 | Jones | G01P 15/093 250/227.14 |
| 6,606,445 B2 | 8/2003 | Weigel | |
| 6,847,745 B2 * | 1/2005 | Bosselmann | G02B 6/4457 356/73.1 |
| 7,533,572 B2 * | 5/2009 | Twerdochlib | G01H 9/006 356/28.5 |
| 8,076,909 B2 * | 12/2011 | Diatzikis | H02K 11/25 322/99 |
| 8,089,002 B2 * | 1/2012 | Hasegawa | F16J 3/042 16/2.1 |
| 8,353,721 B2 * | 1/2013 | Deimel | H02G 3/22 439/607.41 |
| 8,379,225 B2 * | 2/2013 | Koste | G01B 11/18 250/227.14 |
| 8,422,008 B2 * | 4/2013 | Xia | G01D 5/35316 356/237.1 |
| 8,513,543 B1 * | 8/2013 | Lin | H02G 15/013 174/656 |
| 8,636,422 B2 | 1/2014 | Kahle et al. | |
| 8,770,024 B1 * | 7/2014 | Paritsky | G01P 15/093 250/227.14 |
| 9,188,463 B2 * | 11/2015 | Olechnowicz | G01D 11/245 |
| 9,270,048 B2 * | 2/2016 | Harwath | H01R 13/52 |
| 2005/0281510 A1 | 12/2005 | Vo et al. | |
| 2006/0172578 A1 * | 8/2006 | Parsons | H01R 13/5202 439/291 |
| 2008/0131067 A1 * | 6/2008 | Ugolini | G02B 6/4455 385/135 |
| 2009/0074369 A1 * | 3/2009 | Bolton | G02B 6/4441 385/135 |
| 2010/0080516 A1 * | 4/2010 | Coleman | G02B 6/3887 385/80 |
| 2011/0128655 A1 * | 6/2011 | Hochlehnert | G01R 15/246 361/20 |
| 2012/0026482 A1 * | 2/2012 | Dailey | G01D 5/35303 356/43 |
| 2012/0086443 A1 * | 4/2012 | Bazzone | G01J 1/0492 324/244.1 |
| 2012/0204651 A1 * | 8/2012 | Diatzikis | G01H 11/045 73/655 |
| 2012/0209545 A1 * | 8/2012 | Humphries | G01H 13/00 702/56 |
| 2013/0273483 A1 * | 10/2013 | Spalding | G01J 5/0821 431/79 |
| 2013/0318994 A1 * | 12/2013 | Hoffman | F23M 11/045 60/779 |
| 2014/0053574 A1 * | 2/2014 | McConkey | F23N 5/082 60/803 |
| 2014/0216155 A1 * | 8/2014 | Olechnowicz | G01D 11/245 73/431 |
| 2015/0030303 A1 * | 1/2015 | Kuffel | G02B 6/4471 385/136 |
| 2015/0039250 A1 * | 2/2015 | Rank | H04R 29/00 702/56 |
| 2015/0043310 A1 * | 2/2015 | Maas | G01V 1/201 367/188 |
| 2015/0323353 A1 * | 11/2015 | Diatzikis | G02B 6/4402 385/12 |

* cited by examiner

FIBER OPTIC SENSING APPARATUS WITH AN IMPROVED FIBER-AFFIXING DEVICE

FIELD OF THE INVENTION

Aspects of the present invention relate generally to a fiber optic sensing apparatus for sensing conditions in an electromotive machine, and, more particularly, to a fiber optic sensing apparatus with an improved fiber-affixing device.

BACKGROUND OF THE INVENTION

Electromotive machines, such as large electrical generators used in the field of power generation, include stator windings that, for example, can carry several thousand amperes of current. The stator windings comprise a large number of conductors or stator bars that are pressed into slots in a stator core and end windings that can extend beyond the stator core. Such a machine represents a very expensive and long-term investment. For example, a malfunction of the generator not only endangers the power equipment itself but may also result in substantially costly and burdensome service reduction due to the down time associated with a repair. To avoid such a condition, increasing use is being made of fiber optic technology for sensing conditions of the machine.

Due to the delicate nature of optical fibers, it is desirable to provide appropriate protection for such optical fibers and the resulting assemblage of an fiber optic sensing apparatus. It is known, for example, to affix a connecting end of a protective jacket in an optical fiber sensor to a housing by way of bonding adhesives. However, this implementation is prone to de-bonding of the connecting end with respect to the housing, which can eventually lead to breakage of the optical fiber sensor. Therefore, a cost-effective and reliable connection for such fiber optic sensing apparatus is desirable. Disclosed embodiments are believed to successfully address at least such needs.

BRIEF DESCRIPTION OF THE DRAWINGS

The invention is explained in the following description in view of the drawings that show.

DETAILED DESCRIPTION OF THE INVENTION

In the following detailed description, various specific details are set forth in order to provide a thorough understanding of such embodiments. However, those skilled in the art will understand that embodiments of the present invention may be practiced without these specific details, that the present invention is not limited to the depicted embodiments, and that the present invention may be practiced in a variety of alternative embodiments. In other instances, methods, procedures, and components, which would be well-understood by one skilled in the art have not been described in detail to avoid unnecessary and burdensome explanation.

Furthermore, various operations may be described as multiple discrete steps performed in a manner that is helpful for understanding embodiments of the present invention. However, the order of description should not be construed as to imply that these operations need be performed in the order they are presented, nor that they are even order dependent unless otherwise so described. Moreover, repeated usage of the phrase "in one embodiment" does not necessarily refer to the same embodiment, although it may. Lastly, the terms "comprising", "including", "having", and the like, as used in the present application, are intended to be synonymous unless otherwise indicated.

Figure 1:
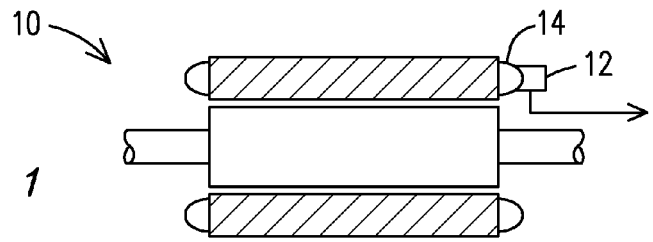
FIG. 1 is schematic representation of an electromotive machine, such as a power generator that may benefit from a fiber optic sensing apparatus embodying aspects of the present invention.

FIG. 1 is a schematic representation of an electromotive machine 10, such as a power generator that may benefit from a fiber optic sensing apparatus 12 embodying aspects of the present invention. In one non-limiting application, fiber optic sensing apparatus 12 may comprise an optical fiber vibration sensor mounted onto an end-winding 14 of electromotive machine 10 to monitor vibration of end-winding 14. It will be appreciated that aspects of the present invention are not limited to any specific sensing condition of the electromotive machine or to monitoring any specific component of the electromotive machine. Non-limiting sensing conditions may further include temperature sensing, strain sensing, etc. Non-limiting example components that may be monitored with a fiber optic sensing apparatus embodying aspects of the present invention may further include a lead box of the generator, main connection leads of the generator, etc.

Figure 2:
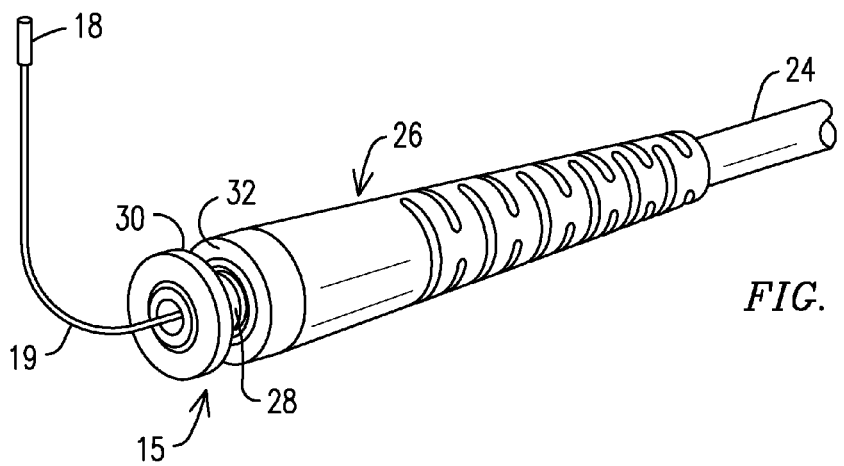
FIG. 2 is an isometric view illustrating a non-limiting embodiment of a fiber-affixing device for the fiber optic sensing apparatus.
Figure 3:
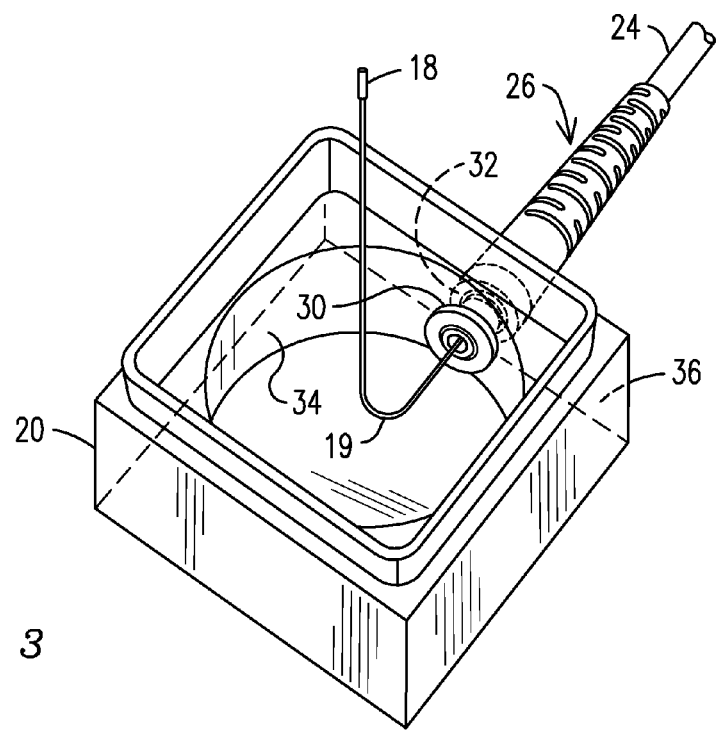
FIG. 3 is an isometric view of a fiber optic sensing apparatus including a housing that accommodates a fiber optic sensor.

FIG. 2 is an isometric view illustrating a non-limiting embodiment of a fiber-affixing device 15 for fiber optic sensing apparatus 12 that includes a fiber optic sensor 18 accommodated in a housing 20 (FIG. 3). In one non-limiting embodiment an optical fiber jacket 24 encases an optical fiber 19 that extends into the housing through an opening formed in the housing.

In one non-limiting embodiment, fiber optic sensing apparatus 12 comprises a protective end boot 26 including a sleeve 28 disposed in the opening in housing 20 to hold optical fiber 19 through the opening. Sleeve 28 may be a cylindrical shaped structure interposed between mutually opposed bearing surfaces 30, 32 arranged to constrain axial movement of sleeve 28 with respect to an inner wall 34 and an outer wall 36 of housing 20 surrounding the opening formed in the housing. Bearing surfaces 30, 32 may be conceptually analogized to provide mechanical anchoring functionality to sleeve 28 and the optical fiber 19 held in sleeve 28 with respect to inner wall 34 and outer wall 36 of housing 20. This is effective to affix optical fiber 19 within the opening and results in a substantially strong and robust connection thus greatly improving the robustness and survivability of the optical fiber sensor.

Figure 5:
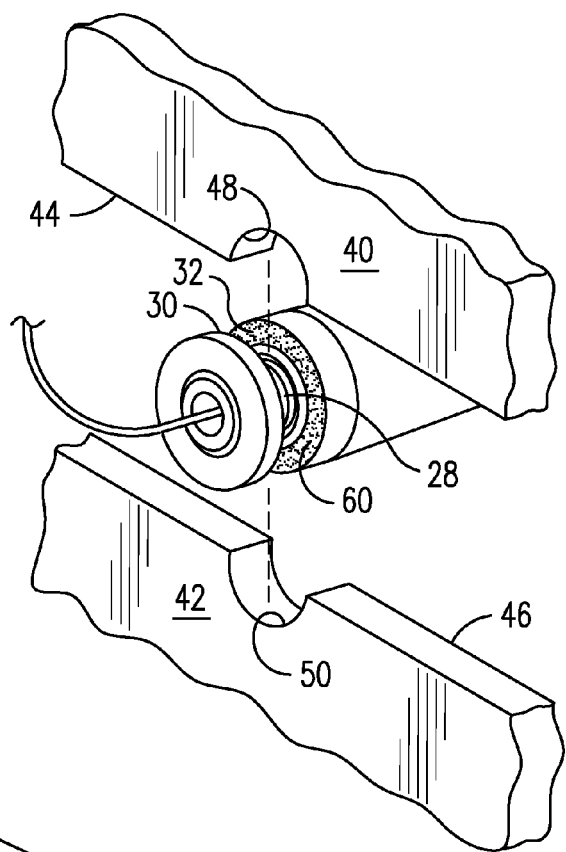
FIG. 5 is an isometric, exploded view illustrating example cutouts constructed in the first and second housing members.

One may additionally deposit a layer of adhesive 60 (FIG. 5) to bond at least the mutually opposed bearing surfaces 30, 32 to the respective inner and outer walls of the housing. Depending on the needs of a given application, one could alternatively insert a suitable elastomeric material as a filler material between the mutually opposed bearing surfaces 30, 32 and the respective inner and outer walls of the housing.

Figure 4:
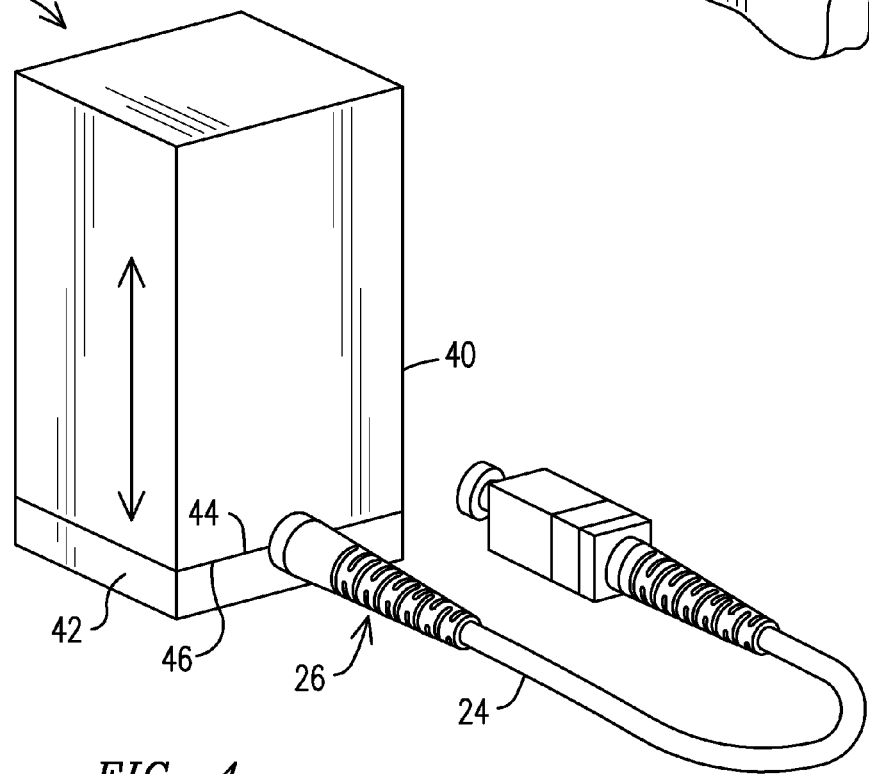
FIG. 4 is an isometric view of one non-limiting embodiment of a housing made up of a first housing member and a second housing member joined at mutually opposed edges including cutouts that in combination form an opening in the housing to fit the fiber-affixing device.

In one non-limiting embodiment, as may be appreciated in FIG. 4, housing 20 comprises a first housing member 40 and a second housing member 42 joined at mutually opposed edges 44, 46. In this embodiment, housing members 40, 42 may be conceptually analogized to form a clam shell housing structure. Housing members 40, 42 include at the mutually opposed edges 44, 46 corresponding cutouts 48, 50 (FIG. 5) that in combination form the opening in the housing where sleeve 28 is fitted.

Figure 6:
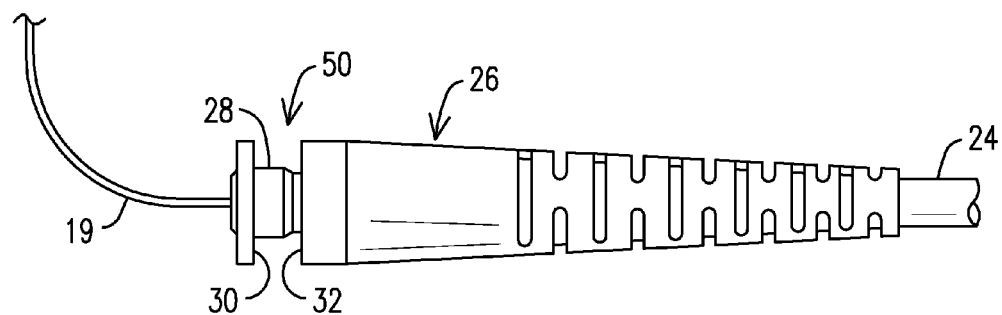
FIG. 6 is a sectional view of a non-limiting embodiment where the fiber-affixing device comprises an H-shaped monolithic structure.

In one non-limiting embodiment, mutually opposed bearing surfaces 30, 32 and sleeve 28 comprise a monolithic structure that may have an H-shaped structure 50 (FIG. 6) configured to straddle inner and outer surfaces of the housing surrounding the cutouts 48, 50 (FIG. 5) that in combination form the opening in the housing when the first and second housing members 40, 42 are joined at the mutually opposed edges. That is, when the first and second housing members 40, 42 are superimposed onto one another.

In one non-limiting embodiment, sleeve 28 of the monolithic structure may be initially mounted on the cutout of one of the first and second housing members, (e.g., cutout 50 at edge 46 of housing member 42) and, in this example, cutout 50 circumferentially surrounds a portion (e.g., approximately one-half) of sleeve 28. When the first and second housing members 40, 42 are joined to one another, the cutout of the other one of the first and second housing members (e.g., cutout 48 at edge 44 of housing member 40) is arranged to circumferentially surround the remaining portion (approximately the remaining half) of sleeve 28.

Figure 7:
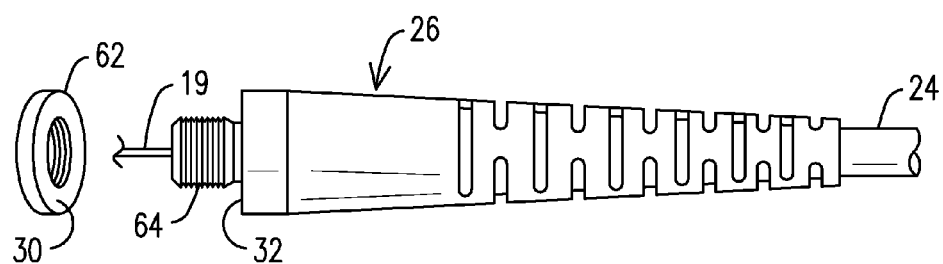
FIGS. 7 and 8 respectively illustrate a flow sequence for affixing a separate annular structure to the sleeve to form another non-limiting embodiment of the fiber-affixing device.
Figure 8:
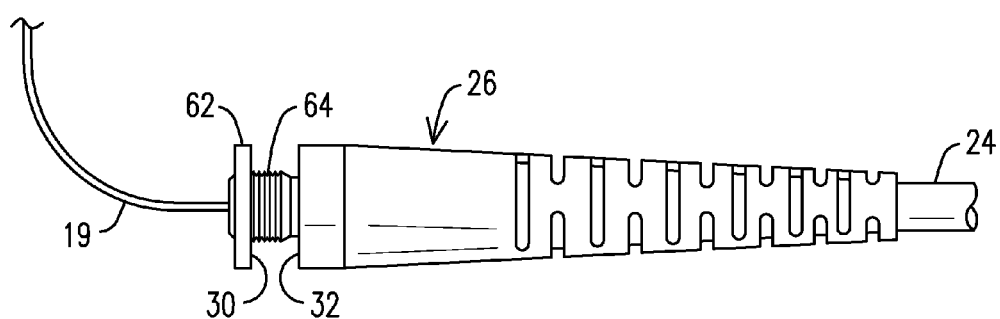

As may be appreciated in the flow sequence illustrated in FIGS. 7 and 8, in one non-limiting embodiment, the bearing surface (e.g., surface 30) that faces the inner wall of the housing may be provided by a separate annular structure 62, such as a ring, affixable to the sleeve. In this embodiment, sleeve 28 is directly insertable through the opening in the housing, and the annular structure may be affixed to the sleeve by way of a threaded connection, schematically represented by threads 64. It will be appreciated that annular structure 62 may be secured by way of techniques well-understood by those skilled in the art to prevent vibration-induced loosening, such as may include a locking fastener, or application of an adhesive such as Loctite brand adhesive, or a double nut locking fastener, etc.

In one example embodiment, fiber optic sensing apparatus 12 comprises a housing 20 enclosing an optical fiber sensor 18. An optical fiber 19 extends into the housing through an opening formed in the housing. A fiber-affixing device 15 is affixed to the optical fiber proximate the opening. The fiber-affixing device comprises opposed bearing surfaces 30, 32 extending away from the optical fiber and disposed against opposed inner and outer surfaces (e.g., wall surfaces) of the housing surrounding the opening. In operation, the fiber-affixing device is effective to affix the optical fiber within the opening. The fiber-affixing device results in a substantially strong and robust connection thus greatly improving the robustness and survivability of the optical fiber sensor.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A fiber optic sensing apparatus comprising:
    a housing to accommodate an optical fiber sensor, the housing mounted onto a component of an electrical generator to sense with the optical fiber sensor a condition of the component of the electrical generator; and
    an optical fiber jacket comprising an end boot including a sleeve disposed in an opening formed in the housing to hold an optical fiber through the opening, the sleeve interposed between mutually opposed annular bearing surfaces extending away from the optical fiber and arranged to constrain axial movement of the sleeve with respect to inner and outer walls of the housing.

2. The fiber optic sensing apparatus of claim 1, wherein the housing comprises a first housing member and a second housing member joined at mutually opposed edges, the housing members including at the mutually opposed edges corresponding cutouts that in combination form the opening in the housing.

3. The fiber optic sensing apparatus of claim 2, wherein the mutually opposed bearing surfaces and the sleeve comprise a monolithic structure.

4. The fiber optic sensing apparatus of claim 3, wherein the monolithic structure comprises an H-shaped structure configured to straddle the corresponding cutouts that in combination form the opening in the housing when the first and second housing members are joined at the mutually opposed edges.

5. The fiber optic sensing apparatus of claim 4, further comprising a layer of adhesive to bond at least the mutually opposed bearing surfaces to the respective inner and outer walls of the housing.

6. The fiber optic sensing apparatus of claim 1, wherein the bearing surface that faces the inner wall of the housing comprises an annular structure affixable to the sleeve.

7. The fiber optic sensing apparatus of claim 6, wherein the sleeve is insertable through the opening in the housing, and wherein the annular structure is affixed to the sleeve by way of a threaded connection.

8. The fiber optic sensing apparatus of claim 1, wherein the sensed condition of the component of the electrical generator is selected from the group consist-ing of vibration, strain and temperature.

9. The fiber optic sensing apparatus of claim 1, wherein the component of the electrical generator comprises an end-winding of the electrical generator.

10. A fiber optic sensing apparatus comprising:
    a housing to accommodate an optical fiber sensor, the housing mounted onto a component of an electrical generator to sense with the optical fiber sensor a condition of the component of the electrical generator, wherein the housing comprises a first housing member and a second housing member joined at mutually opposed edges, the housing members including at the mutually opposed edges corresponding cutouts that in combination form an opening in the housing; and
    an optical fiber jacket comprising an end boot including a sleeve disposed in the opening in the housing to hold an optical fiber through the opening, the sleeve interposed between mutually opposed annular bearing surfaces extending away from the optical fiber and arranged to constrain axial movement of the sleeve with respect to respective inner and outer walls of the housing.

11. The fiber optic sensing apparatus of claim 10, wherein the mutually opposed bearing surfaces and the sleeve comprise a monolithic structure.

12. The fiber optic sensing apparatus of claim 11, wherein the monolithic structure comprises an H-shaped structure configured to straddle the corresponding cutouts that in combination form the opening in the housing when the first and second housing members are joined at the mutually opposed edges.

13. The fiber optic sensing apparatus of claim 11, wherein the sleeve of the monolithic structure is initially mounted on the cutout of one of the first and second housing members, which cutout circumferentially surrounds a portion of the sleeve, and, when the first and second housing members are joined to one another, the cutout of the other one of the first and second housing members is arranged to circumferentially surround a remaining portion of the sleeve.

14. The fiber optic sensing apparatus of claim 10, further comprising a layer of adhesive to bond at least the mutually opposed bearing surfaces to the respective inner and outer walls of the housing.

15. The fiber optic sensing apparatus of claim 10, wherein the sensed condition of the component of the electromotive machine is selected from the group consisting of vibration, strain sensor and temperature.

16. The fiber optic sensing apparatus of claim 10, wherein the component of the electrical generator comprises an end-winding of the electrical generator.

* * * * *